(12) United States Patent
Mahajan et al.

(10) Patent No.: US 12,488,367 B2
(45) Date of Patent: Dec. 2, 2025

(54) DRIVE UP INCENTIVIZATION ENGINE IN AN ORDER FULFILLMENT SYSTEM

(71) Applicant: Target Brands, Inc., Minneapolis, MN (US)

(72) Inventors: Gagan Mahajan, Minneapolis, MN (US); Anshul Chawla, Minneapolis, MN (US); Balaji Varadarajan, Minneapolis, MN (US); Nicholas Johnson, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 64 days.

(21) Appl. No.: 18/414,895

(22) Filed: Jan. 17, 2024

(65) Prior Publication Data

US 2025/0232329 A1    Jul. 17, 2025

(51) Int. Cl.
*G06Q 30/02* (2023.01)
*G06Q 10/0836* (2023.01)
*G06Q 30/0235* (2023.01)

(52) U.S. Cl.
CPC ..... *G06Q 30/0235* (2013.01); *G06Q 10/0836* (2013.01)

(58) Field of Classification Search
CPC .................................................. G06Q 10/0836
See application file for complete search history.

(56) References Cited

U.S. PATENT DOCUMENTS

| | | | |
|---|---|---|---|
| 10,600,041 B2 | 3/2020 | Kelly et al. | |
| 2009/0281888 A1 | 11/2009 | Zai et al. | |
| 2015/0193859 A1* | 7/2015 | Colello | G06Q 30/0635 705/14.23 |
| 2015/0242944 A1* | 8/2015 | Willard | G06Q 10/02 705/5 |
| 2016/0239903 A1* | 8/2016 | Othmer | H04L 51/214 |
| 2017/0330144 A1* | 11/2017 | Wakim | G06Q 10/083 |

(Continued)

OTHER PUBLICATIONS amazon.com, "Rewards for Delayed Shipping," Jan. 2023, retrieved Nov. 11, 2015 from URL <https://www.amazon.com/b?ie=UTF8&node=9433645011>, 3 pages.

(Continued)

*Primary Examiner* — Vincent M Cao
(74) *Attorney, Agent, or Firm* — Fish & Richardson P.C.

(57) ABSTRACT

The disclosed technology provides for incentivizing a user to pick up an order at an fulfillment location. A method can include receiving, at a mobile device, information for picking up an order at a fulfillment location and and incentization information from a server system, where the incentivization information includes information for an incentive associated with picking up the order at the fulfillment location during an incentivization window. The method can include changing a display of the computing device to display information for picking up the order during the incentivization window, receiving a second communication from the computing device indicating that the computing device has arrived at the fulfillment location, and changing the display of the computing device to display a confirmation of the incentivization information based on whether the particular timepoint at which the computing device arrived at the fulfillment location is within the incentivization window.

20 Claims, 9 Drawing Sheets

(56) References Cited

U.S. PATENT DOCUMENTS

| | | | | |
|---|---|---|---|---|
| 2019/0012638 A1* | 1/2019 | Rajkhowa | .......... | G06Q 10/0836 |
| 2021/0097483 A1* | 4/2021 | Canseco | ............ | G06Q 10/0836 |
| 2021/0125445 A1* | 4/2021 | Zhang | .................... | G06N 20/00 |
| 2021/0264357 A1* | 8/2021 | Werber | .............. | G06Q 10/0836 |
| 2022/0101257 A1* | 3/2022 | Wason | ............... | G06Q 30/0206 |
| 2022/0398526 A1* | 12/2022 | Krishnamoorthy | ......................... | |
| | | | | G06Q 10/063116 |
| 2023/0055840 A1* | 2/2023 | Li | ........................ | G06Q 10/087 |

OTHER PUBLICATIONS pymnts.com, "Restaurants Incentivize Pickup Adoption With Store Credit Rewards," Mar. 24, 2023, retrieved Nov. 15, 2023 from URL <https://www.pymnts.com/news/loyalty-and-rewards-news/2023/restaurants-incentivize-pickup-adoption-store-credit-rewards/>, 7 pages.
veyo.com, "Peak Time Rewards," Jan. 2022, retrieved Nov. 15, 2023 from URL <https://support.veyo.com/hc/en-us/articles/360039667311-Peak-Time-Rewards>, 4 pages.

\* cited by examiner

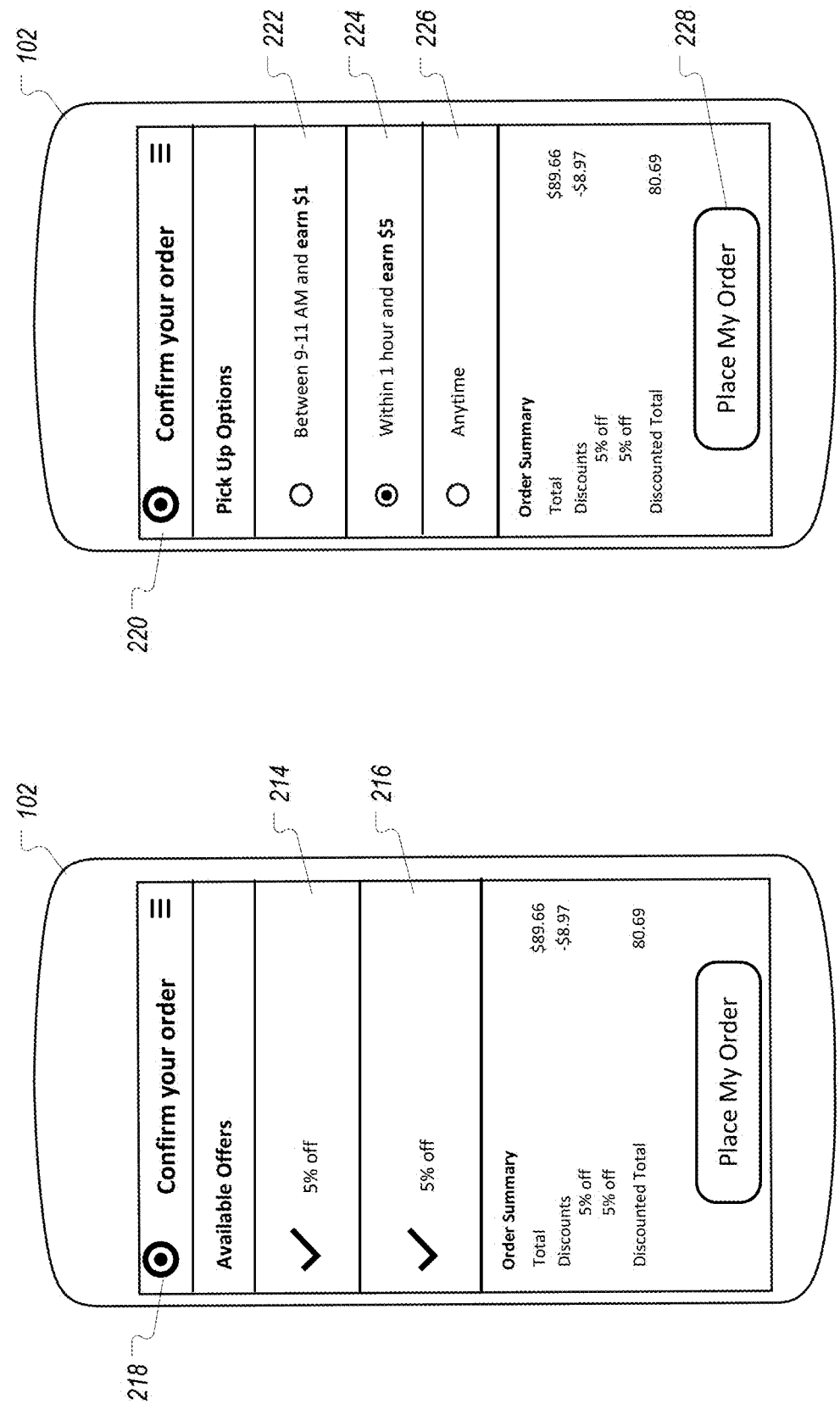

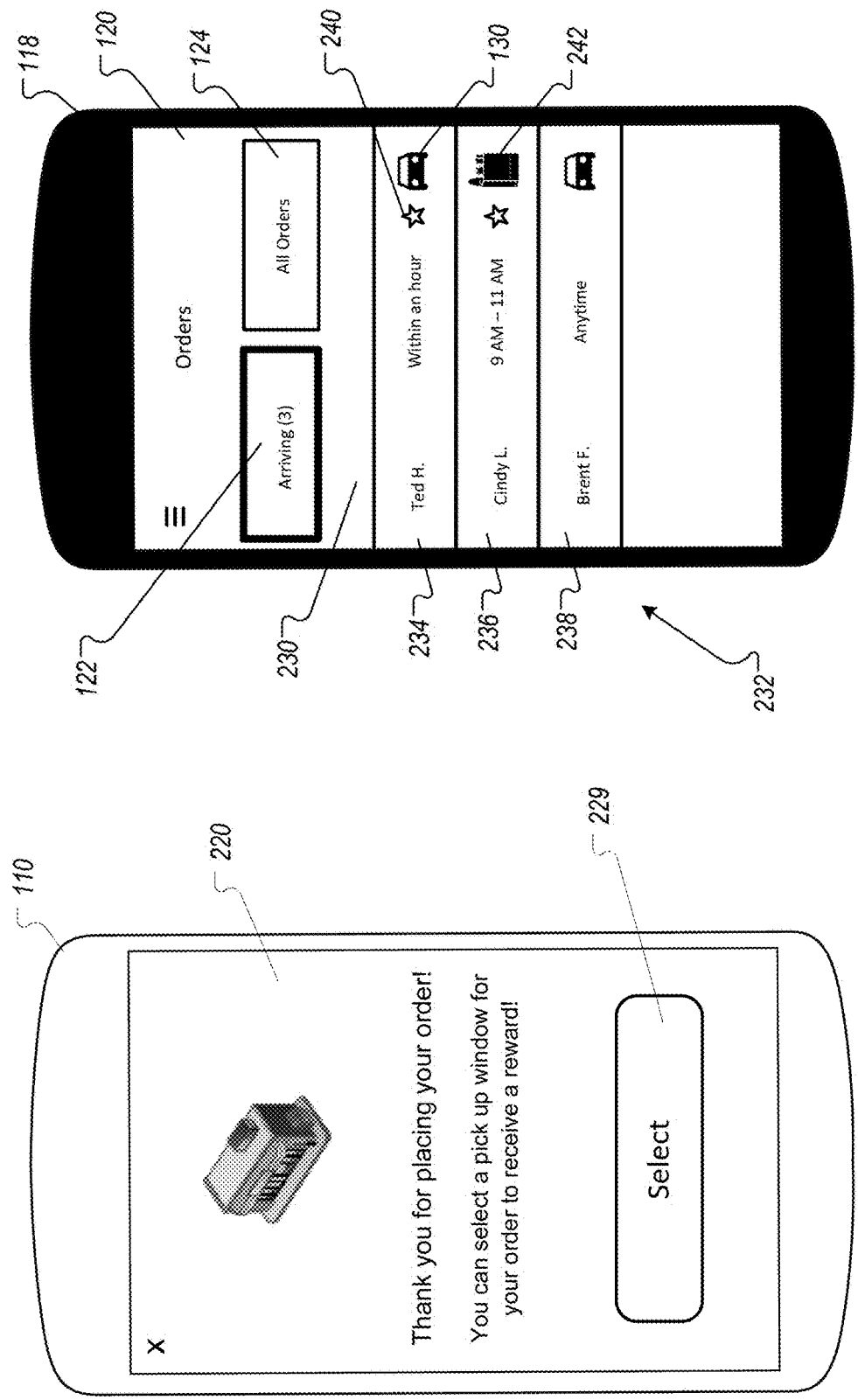

DRIVE UP INCENTIVIZATION ENGINE IN AN ORDER FULFILLMENT SYSTEM

TECHNICAL FIELD

This document generally relates to architecture of computer systems, communications between computing devices, and graphic user interfaces for eliciting user input.

BACKGROUND

Computing devices are devices that accept data input, process the data, and provide data output using hardware and software. Computing devices can communicate with other computing devices using wired or wireless networks or a combination thereof. For example, computing devices can communicate over the Internet. User interactions with a computing device can cause the computing device to transmit communications to a second computing device, which can cause the second computing device to provide output such as changes to a visual display, sounds, or tactile output. Such output at the second computing device can elicit user input from a user of the second computing device, which can in turn cause the second computing device to transmit one or more communications to the first computing device thereby causing the first computing device to generate additional output.

SUMMARY

This document generally describes a network based order fulfillment system that provides information to one or more mobile devices that encourages users, such as customers, to pick up orders within a certain period of time. More particularly, the disclosed technology provides techniques for incentivizing customers to arrive and pick up drive up or pickup orders within an incentivization window at a fulfillment location (such as a physical store location, a restaurant, a warehouse, or other location).

The disclosed technology provides for incentivizing a user to pick up an order at an fulfillment location. A method can include receiving, at a mobile device, information for picking up an order at a fulfillment location and incentivization information from a server system, where the incentivization information includes information for an incentive associated with picking up the order at the fulfillment location during an incentivization window. The method can include changing a display of the computing device to display information for picking up the order during the incentivization window, receiving a second communication from the computing device indicating that the computing device has arrived at the fulfillment location, and changing the display of the computing device to display a confirmation of the incentivization information based on whether the particular timepoint at which the computing device arrived at the fulfillment location is within the incentivization window.

One or more embodiments described herein can include a method including: receiving, by a computing device, a first communication from a server system including information for picking up an order at a fulfillment location at a plurality of timeframes, wherein the computing device is logged into an account of the user, wherein the information for picking up the order includes indications of one or more items and an identifier associated with the account of the user; receiving, by the computing device, incentivization information from the server system including information for an incentive associated with picking up the order at the fulfillment location during an incentivization window, wherein the incentivization window is a timeframe from the plurality of timeframes associated with an incentive; changing a display of the computing device to display information for picking up the order at the fulfillment location based on the user selecting the incentivization window; receiving, by the server system, a second communication from the computing device indicating that the computing device has arrived at the fulfillment location at a particular timepoint based on a location of the computing device; and changing the display of the computing device to display a confirmation of the incentivization information based on whether the particular timepoint at which the computing device arrived at the fulfillment location is within the incentivization window.

The system can optionally include one or more of the abovementioned features.

The devices, system, and techniques described herein may provide one or more of the following advantages. For example, the disclosed techniques provide for encouraging users to pick up order within a certain timeframe. In particular, the disclosed techniques provide users with incentivization information associated with respective pick up timeframes for orders. The incentivization information can include an incentive (e.g., a reward) corresponding to the pick up timeframe, such as a monetary credit to the user's account, a discount on a current order, or a discount on a future order (e.g., 5% off the customer's next order). In some cases, the incentive can be a free or discounted item associated with the fulfillment location. For example, the incentive can be an additional product that the user picks up as part of their order or from a vendor affiliated with the fulfillment location at the time of picking up their order (such as a food vendor located in or near the fulfillment location).

In some examples, the order may include one or more perishable items or one or more seasonal items, and the user may be encouraged by the incentivization information (e.g., a reward) to pick up their order within a particular period of time. In some examples, the order can be associated with a guest abandonment prediction, where a trained neural network can predict the likelihood of guest abandonment (e.g., that a user will not pick up their order), and the disclosed techniques can allow for the order to be associated with incentivization information such that a user is encouraged to pick up their order instead of abandoning their order. In some examples, the pickup timeframe corresponding to the incentive can be a low traffic timeframe. In this case, the low traffic timeframe is a timeframe during which a relatively lower amount of users may be scheduled to pick up their orders from a fulfillment location (e.g., a store), such that user may be able to pick up their order in an expedited manner due to the lower amount of traffic.

The order fulfillment process can therefore be performed accurately and efficiently by using incentivization information to decrease delays in the process. By providing incentivization information to devices operated by users/customers, an order fulfillment system can increase the efficiency of users picking up their orders and decrease an amount of abandoned user orders, thereby leading to improved outcomes with respect to efficiency and accuracy of both user interactions with the mobile computing devices and fulfillment of orders. Other benefits and advantages will be apparent from the following descriptions.

As another example, the disclosed techniques can be performed to reduce storage inefficiency or avoid food-based waste by encouraging users to pick up their orders within a particular timeframe based on items in the orders. With the disclosed techniques, food items or specialty items can be associated with an incentive to pick up the order during a certain timeframe, thereby improving overall customer experience and satisfaction with the order fulfillment process, ensuring quality of items provided by the fulfillment location for drive up and pickup orders, and reducing food item-based waste.

The systems, devices, program products, and processes described throughout this document can, in some instances, provide one or more of the following advantages. By providing streamlined communications between mobile devices operated by users/customers and employees working at fulfillment locations, an order fulfillment system can reduce the amount of time spent interacting with the mobile devices, thereby reducing power consumption and improving battery life of the computing devices. Additionally, by streamlining communications while providing for computer network based ordering and pick-up facilitation, the computing system can reduce the amount of communications to and from mobile computing devices, thereby reducing bandwidth usage of one or more communications networks and freeing up communications bandwidth for other purposes. Additionally, the unique user interface elements described here can reduce the likelihood of perishable items or other time sensitive items becoming spoiled and having to be discarded, thereby preserving resources and preventing undesirable food waste. The improved communications between computing devices of users/customers and computing devices of employees can ensure that a customer travels during optimum times (e.g., during times that avoid rush hour or other heavy traffic periods), thereby reducing fuel/energy consumption, reducing traffic congestion, and improving user outcomes. Additionally, unique user interface elements at mobile computing devices of both users/customers and employees of fulfillment locations can improve user experience thereby leading to improved outcomes with respect to efficiency and accuracy of both user interactions with the mobile computing devices and fulfillment of orders. Other benefits and advantages will be apparent from the following descriptions.

The details of one or more implementations are set forth in the accompanying drawings and the description below. Other features and advantages will be apparent from the description and drawings, and from the claims.

BRIEF DESCRIPTION OF THE DRAWINGS

FIGS. 2A-2L show example user interface displays and employee interface displays for computing devices in the drive-up order fulfillment system.

Like reference symbols in the various drawings indicate like elements.

DETAILED DESCRIPTION OF ILLUSTRATIVE EMBODIMENTS

Figure 1:
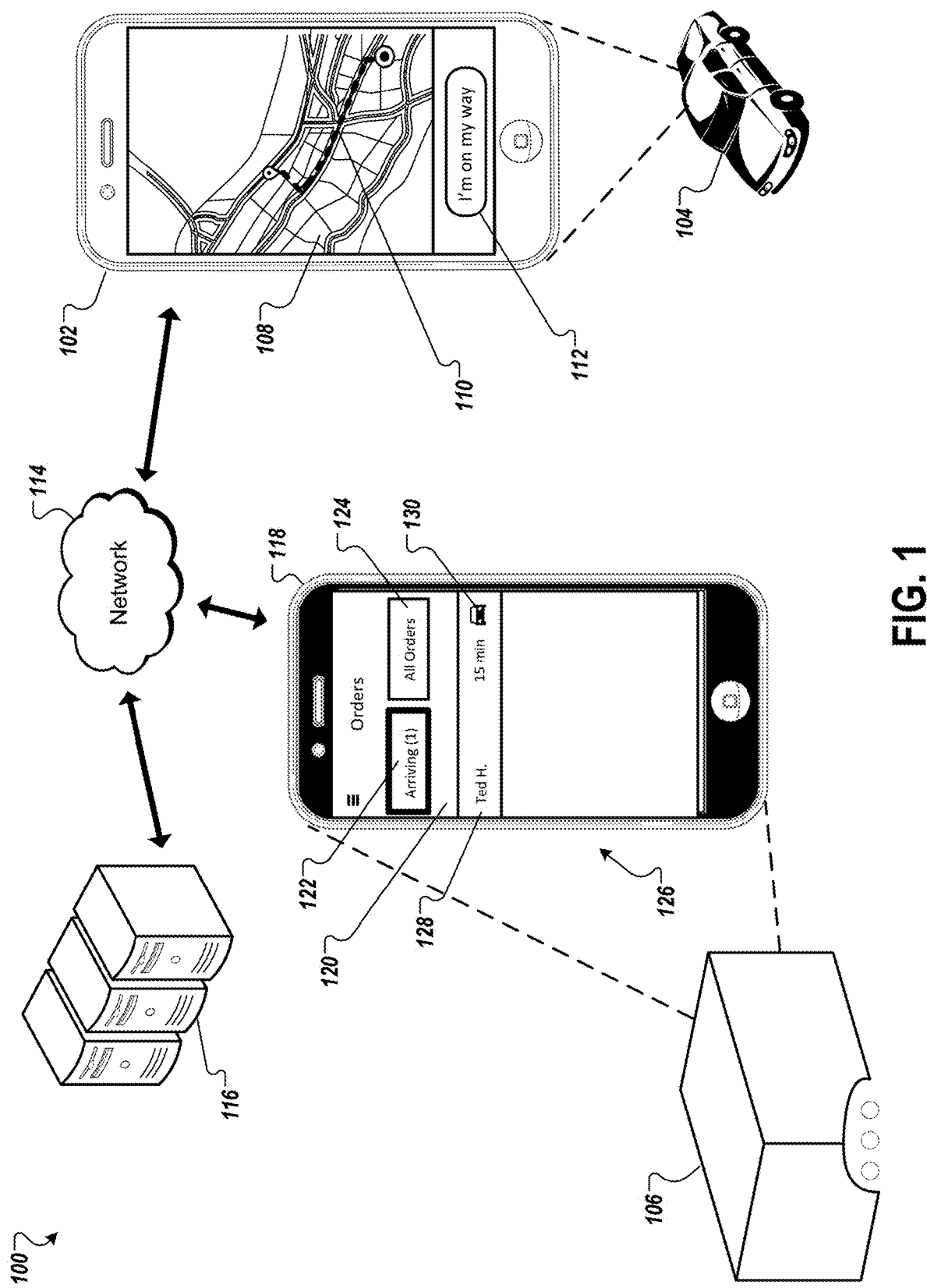
FIG. 1 is diagram of an example system for facilitating drive-up order fulfillment.

Referring to the figures, FIG. 1 is a diagram of an example system 100 for facilitating order fulfillment for drive-up pickup by users. In the system 100, a customer who wishes to complete an online order for items by picking up the items using a drive-up service can access a dedicated application executing on a mobile device 102. The mobile device 102 can be, for example, a mobile phone, a tablet device, a touch screen computer, a laptop computer, a PDA, a smart watch, or other mobile device. In some implementations, instead of accessing a dedicated application executing on the mobile device 102, the customer can use a browser of the mobile device 102 to access a website that provides the below described functionality. Therefore descriptions related to use of the dedicated application apply equally to a web-based implementation.

The customer can use the dedicated application to select items for purchase from a store or other fulfillment location using an online shopping interface. For example, the dedicated application can be a grocery shopping application that can permit the customer to search and/or browse for grocery items, add desired items to a virtual shopping cart, and place an order for the selected items by entering payment information. The customer can also use the dedicated application to access one or more previously entered orders. For example, a user may have previously logged into an online account for a retailer associated with the dedicated application and placed an on-line order for one or more items using either the mobile device 102 or a different computing device such as a home or laptop computer. As another example, the customer may have previously placed an on-line order using the dedicated application. The customer can access and review the previously placed orders after logging into the dedicated application. This can include reviewing items included in the orders, estimated time until the order is ready, payment used for the order (e.g., "card ending in 123"), a fulfillment location for the order, incentivization information, and other information associated with the orders.

The mobile device 102 can communicate with other computing devices through a network 114, such as, for example, the Internet. For example, the mobile device 102 can communicate with a network access point such as a WiFi router or a cellular communication tower to access the network 114 and communicate with other computing devices. For example, the mobile device 102 can communicate with a server system 116 consisting of one or more servers to place the order. Alternatively, or additionally, the customer can use a different computer to place the order and the different computer can communicate through the network 114 with the server system 116. The server system 116 can be affiliated with a retailer and process the on-line order received from the mobile device 102 or another computing device. The server system 116 can facilitate fulfillment of the order by providing details of the order, such as ordered items, identity of the customer, an order number, time that the order was placed, etc. to one or more computing devices located at a fulfillment center such as a store 106. For example, the store 106 can be part of a chain of affiliated stores associated with a retailer and the server system 116 can be a server system associated with the retailer. Upon receiving an on-line order from the customer, the server system 116 can identify the store 106 as an appropriate fulfillment location for the order based on information such as, an indication of a preferred location for fulfillment indicated by the customer at the mobile device 102 or another computing device, a current location of the mobile device 102, another location associated with the customer (e.g., home or work address information entered by the user into a customer profile), based on item availability (e.g., by identifying a store where all or a majority of the items in the order are in stock), or based on a combination of these and one or more other factors.

For example, the server system 116 can identify the store 106 as an appropriate location for fulfilling the customer's order. The server system 116 can transmit information on the order to a computing device 118 in the possession of, or being used by, a user such as an employee of the store 106. The computing device 118 can be a mobile computing device, such as, for example, a mobile phone, a tablet device, a touch screen computer, a laptop computer, a PDA, a smart watch, or other mobile device. In some implementations, the computing device 118 can be a non-mobile or semi-mobile device such as a server, a desktop computer, a cash register, a smart TV, or other computing device. The server system 116 can provide appropriate information for the order to the computing device 118 such as items in the order, identifying information for the customer who placed the order, time the order was placed, a desired pickup time for the order (e.g., as indicated by the customer at the time of placing the order), an order number, and other relevant information.

At the time of placing the order, or at a different time, such as when logging into the dedicated application, the customer of the mobile device 102 can indicate a desired order fulfillment method for the order. For example, the customer can specify that the order is for drive-up fulfillment. A drive-up fulfillment allows the customer to drive to a fulfillment location, such as a retail store location, a warehouse, or another location where an employee of the retailer can meet the customer at the customer's vehicle 104, verify that the customer is receiving the proper order, and provide the items to the customer without the customer being required to exit their vehicle. For example, the customer can travel to the store 106, park in a designated area of the parking lot of the store 106, notify an employee that they have arrived using the dedicated application, and then receive the purchased items from the employee when the employee brings the items to the customer's vehicle 104.

As another example, the customer can specify that the order is for in-store pickup fulfillment. In-store pickup fulfillment can allow the customer to travel to a fulfillment location, such as the store 106, and enter the store to pick up the purchased items from a designated location within the fulfillment location. Such a fulfillment method can allow the customer greater flexibility by allowing the customer to shop for additional items within the store 106 (e.g., items that the customer wishes to see in-person before purchasing, such as clothing or produce) and then pick up the items from the on-line order at the designated location after completing their in-store shopping. Alternatively, the customer can pick up the order items without also shopping for items at the store 106 in person.

As another example, the customer can specify that the order is for delivery. An employee of the retailer or a third-party service can travel to the customer's home or another drop-off location designated by the customer to deliver the items in the order to the customer.

In the case of both drive-up and in-store pickup type order fulfillments, the customer can receive incentivization information from the server system 116 associated with the order and options for pickup timeframes (e.g., pickup windows). In particular, the customer can select a pickup window to pick up the order, and the pickup window may be associated with an incentive, as described in further detail below with reference to FIGS. 2A-2L and FIG. 3.

Additionally, in the case of both drive-up and in-store pickup type order fulfillments, the customer can begin to travel to the fulfillment location, such as by driving the vehicle 104 to the store 106. In some implementations, information collected or generated by the mobile device 102 can be used to determine that the customer has begun to travel to the order fulfillment location. For example, location information determined by the mobile device 102, as described above, can be used to determine that the mobile device 102 has begun to travel along the route 110. For example, the dedicated application can receive location information for the mobile device 102 over sequential periods of time (e.g., every 2 seconds) and compare the movement of the mobile device 102 based on the changing location information to the route 110 to determine that the customer has begun to travel the route 110. Alternatively or additionally, the customer can select a user interface control 112 provided by the dedicated application to indicate that they have begun traveling toward the store 106. For example, the customer may have selected a permissions setting to not allow the dedicated application to access location information for the mobile device 102. In some implementations, the dedicated application will only display the user interface control 112 in situations in which the customer has not permitted the dedicated application to access location information for the mobile device 102. As another example, the mobile device 102 may be unable to accurately determine its location, for example, due to tall buildings interfering with GPS signals or due to lack of wireless communications access points in the area around the mobile device 102. The dedicated application can provide the user interface control 112 when the mobile device 102 is unable to accurately determine the location of the mobile device 102 so that the customer can indicate that they have begun to travel toward the store 106.

Upon determining that the customer has begun to travel toward the store 106 (e.g., based on location information collected by the mobile device 102 or based on user interaction with the user interface control 112), the mobile device 102 can communicate with one or more computing devices located at and affiliated with the store 106, either directly through the network 114 or by communicating with the server system 116 which in turn communicates appropriate information and instructions to the one or more computing devices located at the store 106. For example, an employee of the store 106 can use the computing device 118, which can receive information relevant to the order from the server system 116. The mobile device 102 can communicate with the server system 116 over the network 114 to indicate to the server system 116 that the customer has begun to travel toward the store 106. The server system 116 can then provide a communication to the computing device 118 of the employee to update information presented at the computing device 118 indicating that the customer of the mobile device 102 is on the way (and thus, that the order for the customer should be prepared and ready for the customer's arrival).

The server system 116 can provide additional information along with this notification or prior to sending the notification that the user is on the way. For example, the server system 116 can provide vehicle identification information to the computing device 118 to allow the employee to more easily identify the customer's vehicle 104 when the customer has arrived at the designating drive-up fulfillment location at the store 106. The server system 116 can also provide information on an estimated time of arrival and/or an estimated time until arrival for the customer. Such timing information can be used to determine ranking of orders to be prepared in a GUI presented at the computing device 118.

The computing device 118 includes a user interface 120. The user interface 120 can, for example, be a user interface for another dedicated application executing on the computing device 118 or another instance of the same dedicated application that is executing on the mobile device 102. The user interface 120 includes a user selectable control 122 that allows the employee to view all arriving orders (e.g., orders for which the user is on the way). The employee can select the control 122 by, for example, using a touch screen interface of the computing device 118 or one or more other input devices of or in communication with the computing device 118. The user interface 120 further includes a control 124 to allow the employee to view all placed orders. This could include all orders placed for fulfillment at the store 106 or all orders assigned specifically to the employee for fulfillment. Selection of the all orders control 124 can cause the user interface 120 to display all orders that have been placed for fulfillment regardless of the user's status (e.g., orders for users that are on the way and orders for users that are not yet on the way).

In the example depicted in FIG. 1, the control 122 is selected and the user interface 120 is displaying a list 126 of orders for which the user is currently on the way and/or has already arrived. For example, an order listing 128 in the list 126 includes the user's name associated with the order, an estimated time until the indicated user is predicted to arrive at the store 106 (15 minutes) and an icon 130 indicating that the user associated with the order listing 128 has selected drive-up order fulfillment. In some implementations, the order listings in the list 126 can include less or more details with respect to each order. For example, each order listing can include an order number. As another example, each order listing can include vehicle identification information. In some cases, the order listing can include a field for an identifier of incentivization information. The identifier for the incentivization information can indicate whether the order is associated with a pickup incentive, where the customer must pick up the order during a selected incentivization window to receive the incentive. The selected incentivization window can be associated with a particular pickup window, as described in further detail below with reference to FIGS. 2A-2L and FIG. 3.

In some implementations, order listings in the list 126 are user selectable to allow the employee to view additional information about each order (as explained in greater detail below). For example, the employee can select the order listing 128 to cause the user interface 120 to display additional information about the order placed by Ted H. (which can be, for example, the user of mobile device 102). Additional details that can be displayed by the user interface 120 in response to selection of the order listing 128 can include an order number, a listing of items in the order, vehicle identification information, special instructions or requests entered by the customer, location information for bag containing the items for the order (e.g., one or more shelf or bin locations at a drive-up order fulfillment staging area), a number of bags for the order, an indication as to whether or not the order includes age restricted items (e.g., cold medicine, alcohol, etc.), and other information for the order.

When the customer arrives for drive-up or pickup, a barcode or other identifier can be presented at the mobile device 102, which can be scanned by the employee using the computing device 118 and/or a scanning device to verify the customer's identity and verify that the order was provided to the customer. For example, the employee can retrieve the bags for the customer's order from appropriate storage bins located at or near the in-store pickup fulfillment location and provide the bags containing the order to the customer. The employee can then scan the barcode (or otherwise enter an identifier, such as by manually entering into the computing device 118 an ID code or number displayed on the mobile device 102) and the computing device 118 can provide a notification indicating that the scanned or entered code matches the customer or their order to ensure that the employee has provided the correct order. Scanning or entry of the identification code can also cause the computing device 118 to display information indicating that the customer has already paid for the order. In some implementations, another scannable code or identifier, such as a QR code, can be displayed, or a human readable numeric or alphanumeric code can be displayed on the customer's mobile device 102.

In some examples, the computing device 118 can send information via the network 114 to the server system 116 indicating that the customer has picked up the order from the store 106. The server system can determine whether the order is associated with an incentive selected by the user based on the pickup window. If the order was associated with an incentive (e.g., 5% off the customer's current order) and the user picked up the order within the incentivization window (e.g., the selected pickup window), the user interface of either the mobile device 102, the computing device 118, or both, can display a confirmation that the customer has received the incentive through their user account, as described in further detail below with reference to FIGS. 2A-2L and FIG. 3.

FIG. 2A-2G show example user interface displays for computing devices in a drive-up order fulfillment system. With respect to FIG. 2A, the user can use a user interface 202 of the designated application to start a new order. For example, the user interface can be a main menu or a settings menu for the dedicated application. In the example shown, the user interface 202 includes controls that the user can select to view details on his account, start a new order or view details on placed orders, view saved items (e.g., for later purchase or review), and view giftcard balances. In some implementations, the user interface 248 can include other controls that allow for other functionality, such as allowing the first user to manage payment methods (e.g., by adding or removing credit card information).

Figures 2A, 2B:
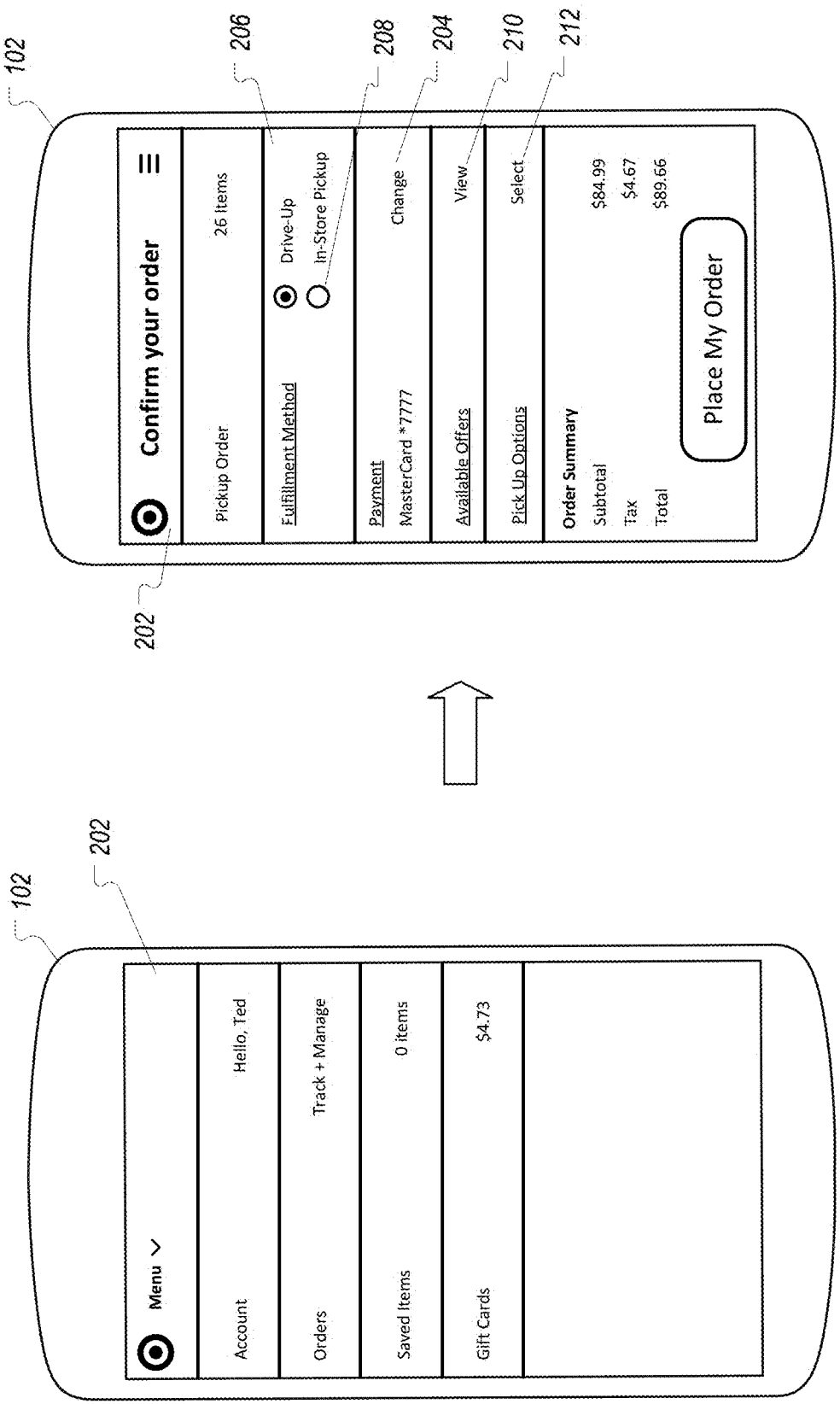

A user can select controls to start a new order, and a user can select one or more products for purchase. The user can select an option to checkout, and selection of the option to checkout can cause the mobile device 102 to display an updated version of the user interface 202, as shown in FIG. 2B. The updated user interface 202 is a user interface displayed by the dedicated application as part of a checkout process for placing an order for pickup. The user interface 202 provides information about the order, including identifying that the order is a pickup order, identifying the number of items in the order ("26 items"), a subtotal, tax amount, and total cost for the transaction, and a payment method for the order. The payment method can be, for example, a pre-stored payment method and the user can change the payment method by, for example, selecting a control 204 to change the payment method.

The user interface 202 further optionally includes a control 206 that allows the user to designate an order fulfillment type for the order. In the example shown in FIG. 2B, the control 206 indicates that the user has selected drive-up order fulfillment and further includes an option to change the order fulfillment type to in-store pickup. The user can interact with the control to change the order fulfillment type to in-store pickup, e.g., by selecting a selection area 208 next to an indication for "In-Store Pickup." In some implementations, the fulfillment method can include additional options, such as an option for delivery of the order.

The user interface 202 further includes a control 210 that allows the user to view available offers (e.g., available discounts) for the current order.

For example, selection of the control 210 can cause the mobile device 102 to display a user interface 218 of available offers (e.g., discounts), displayed in FIG. 2C. In some examples, the available offers can be discounts or gift cards associated with the user account. In some other examples, the offers can be discounts provided to the user an incentive with a previous order placed and fulfilled by the user. For example, if the user previously selected an incentivization window with an incentive of 5% off, and the user picked up the previous order during a designated incentivization window (e.g., an identified span of time during which the user is instructed to pick up the order), the user can apply an offer 214 (e.g., 5% off) for the current order that the user received due to having successfully fulfilled the previous order within the designated incentivization window. In some examples, the incentive can be associated with a rewards program connected to the user account. For example, the user can receive points or credits as part of a rewards program in response to having successfully picked up a previous order within a designated incentivization window. Such points or credits can be used towards future purchases with the retailer or with other affiliated sellers.

In some examples, the incentive can be an additional item that the user picks up as part of their order. For example, the incentive can be a free beverage, and the user may be able to pick up the beverage when they arrive at the fulfillment location to pick up their order. In another example, the incentive can be an accessory, a small retail item, a grocery item, or any other item available for purchase at the fulfillment location. For example, the fulfillment location may include a coffee shop in or near the main fulfillment location building. The customer can be offered a free coffee beverage as an incentive to pick up the order during a specified time frame.

In some examples, there may be multiple available offers (e.g., the offer 214 and an offer 216), and the user can select to apply the multiple offers to the current order. For example, the user may have previously successfully picked up multiple different orders during respective designated fulfillment time windows for those orders. In this example, by selecting the offer 214 and the offer 216, the user can apply a discount of 10% to the total of the current order. Alternatively, the user can select only one of the offers 214 and 216 to apply a 5% discount to the current order. In some embodiments, the number of discounts or offers that the user can use during a single order is restricted. For example, the user can be restricted to using a maximum of three, a maximum of two, or a maximum of one discount or offer per order.

The user interface 202 further includes a control 212 that allows the user to view pick up options for the current order associated with particular pickup windows. For example, selection of the control 212 can cause the mobile device 102 to display a user interface 220, displayed in FIG. 2D. The user interface 220 allows the user to select a pickup window for the order. In some examples, the user can select the pickup window for the order while placing the order. In some other examples, the user can select the pickup window for the order after placing the order, as described in further detail below with reference to FIG. 2E.

In particular, a pickup time window option (e.g., incentivization window 222) can be associated with an incentive. For example, the incentivization window 222 represents a pickup window option between 9 am and 11 am, and the incentive associated with the incentivization window 222 is a $1 monetary discount (e.g., earn $1). In this case, the user can select the incentivization window 222 to receive the incentive if the user picks up their order from the store 106 between 9 am and 11 am. In this case, the incentive can be used as a discount for a future order applied through the user's account. As described above, in some cases the incentive can be a percentage discount to use on the current order or a future order.

As another example, the incentivization window 224 is also associated with an incentive. The incentivization window 224 represents a pickup window option within an hour of placing the order, and the incentive associated with the incentivization window 224 is a $5 monetary discount (e.g., earn $5). In this case, the user can select the incentivization window 224 to receive the incentive if the user picks up the order from the store 106 within an hour of placing their order. In some examples, the incentive can be used as a discount for the current order. For example, if a user selects the incentivization window 224, the $5 discount can be applied to the order subtotal to produce the discounted total. In some examples, the incentive can be applied to a future order through the user's account.

In some cases, the incentive can be a monetary value (e.g., $5) or a percentage of an order (e.g., 10%). In some examples, the incentive can be associated with a rewards program connected to the user account. In some examples, the incentive can be associated with a product of the store 106, such that the user can receive a discounted product based on the selected incentivization window.

As another example, the pickup window (e.g., pickup window 226) is not associated with an incentive. The pickup window 226 represents a pickup window option that the user can pickup their order "anytime." In particular, the user can pick up their order until an employee of the store 106 determines that the order has been abandoned (e.g., the user has not picked up their order within a certain timeframe).

In some examples, the user interface 220 includes a control 228 that allows the user to place the order after selecting a pickup window. In some other examples, the user interface 220 includes a control 220 that allows the user to confirm the selected pickup window after placing their order.

FIG. 2E shows an updated version of the user interface 220 that is displayed once the user has selected the control 228 and confirmed their order.

In some examples, the user interface 220 can be displayed immediately after the user has place the order (e.g., while the user still has the user interface 220 open on the user device). In particular, the user interface 220 can include a control 229 that allows the user to select a pick up time window option after the user has placed their order. For example, selection of the control 229 can cause the user interface 220 to display the pick up time window options of FIG. 2D, and the user can select the pick up window option for their order.

In some other examples, the user device can receive a communication from the server system to select the pick up window option after the user has placed their order. The communication can be communicated to the customer in the form of, for example, a push notification, a text message, an email, or some other electronic communication. The server system may send the communication to the user device based on changes in low traffic timeframes, high traffic timeframes, or both. For example, the server system may send the communication to the user device to indicate a pick up window option based on changes to the busyness of the fulfilment location, changes of a number of orders corresponding to a particular pickup window at the fulfillment location, or both.

In this case, the user can select the pick up time window based on the received communication. For example, the user can click on a link from the communication to display the pick up time window options of FIG. 2D.

In some other examples, the user interface can include a control 229 that allows the user to confirm their selected pick up time window option. In particular, if the user has selected an incentivization window for pick up while placing their order, the user interface 220 will include an indication of the pick up time window for the user to pick up their order in order to successfully receive the reward. In this example, the user selected the incentivization window 224 of "within an hour," and the updated user interface 220 indicates that the user must arrive at the store 106 within an hour in order to receive the $5 reward associated with the incentivization window 224.

The user can then travel to the store at a particular time based on the selected pickup window in order to receive the incentive associated with the selected pick up window. The user can then travel to the store at a particular time based on the selected pickup window in order to receive the reward (e.g., incentive) associated with the selected pick up window.

FIG. 2F shows the computing device 118 displaying the user interface 120 of FIG. 1. In this example, the user selectable control 122 is selected to cause the user interface 120 to display the list 232 orders for which the user is scheduled to arrive. The order listings 234, 236, and 238 provide identification information for users who are on the way to the store 106, information on pick up time windows for each user, and icons indicating fulfillment type for each order and/or incentivization information. The user interface 230 can be displayed by the computing device 118, for example, in response to the computing device 118 receiving the notification from the server system 116 that the user is scheduled to arrive at the store 106 based on a selected pick up window (e.g., the pickup time windows 222, 224, or 226 of FIG. 2D). The computing device 118 updates the user interface 230 to include the user's order in the arriving orders list 232.

For example, the user of the mobile device 102 may be Ted H. Ted may select to pick up their order within an order of placing their order, and picking up their order within an hour can be an incentivization window associated with an incentive. The order listing 234 associated with Ted can include the incentivization window, an indication of the incentive, and a fulfillment type. The incentive can be indicated by a symbol, such as symbol 240. The fulfillment type can be indicated by the symbol 130 to indicate drive-up fulfillment, as previously described. Upon the server system 116 receiving the information included in the order listing 234, the server system 116 provides a notification to the computing device 118 indicating that the pick up time window associated with Ted is relatively soon, and Ted must arrive at the store 106 to pick up their order within the incentivization window to receive the incentive. This can cause the computing device 118 to update the user interface 230 to include the order listing 234 for Ted's order, which had not previously been displayed as part of the user interface 230. Based on how soon each of the pick up time windows associated with the orders indicated by the order listings 234, 236, and 238, the user interface 230 can be updated to keep the employee updated on the status of each user.

In another example, the user of the mobile device 102 may be Cindy L. Cindy may select to pick up their order between 9 AM and 11 AM, and picking up their order between 9 AM and 11 AM can be an incentivization window associated with an incentive. The order listing 236 associated with Cindy can include the incentivization window, an indication of the incentive, and a fulfillment type. The incentive can be indicated by the symbol 240. In some examples, the symbol 240 can be a symbol that represents whether the incentive is a discount, a gift card, or a free or discounted item. For example, if the incentive is a free beverage, the symbol 240 can be an icon of a beverage, indicating to the employee that the free beverage is part of the user's order.

The fulfillment type can be indicated by the symbol 242 to indicate in-store pick up fulfillment. Upon the server system 116 receiving the information included in the order listing 236, the server system 116 provides a notification to the computing device 118 indicating that the pick up time window associated with Cindy is relatively soon, and Cindy must arrive at the store 106 to pick up their order within the incentivization window to receive the incentive. This can cause the computing device 118 to update the user interface 230 to include the order listing 236 for Cindy's order, which had not previously been displayed as part of the user interface 230.

In another example, the user of the mobile device 102 may be Brent F. Brent may select to pick up their order anytime, which is not associated with an incentive. The order listing 238 associated with Brent can include the pick up time window and a fulfillment type. The fulfillment type can be indicated by the symbol 130 to indicate drive-up fulfillment. Upon the server system 116 receiving the information included in the order listing 238, the server system 116 provides a notification to the computing device 118 indicating the pick up time window associated with Brent.

Figure 2H:
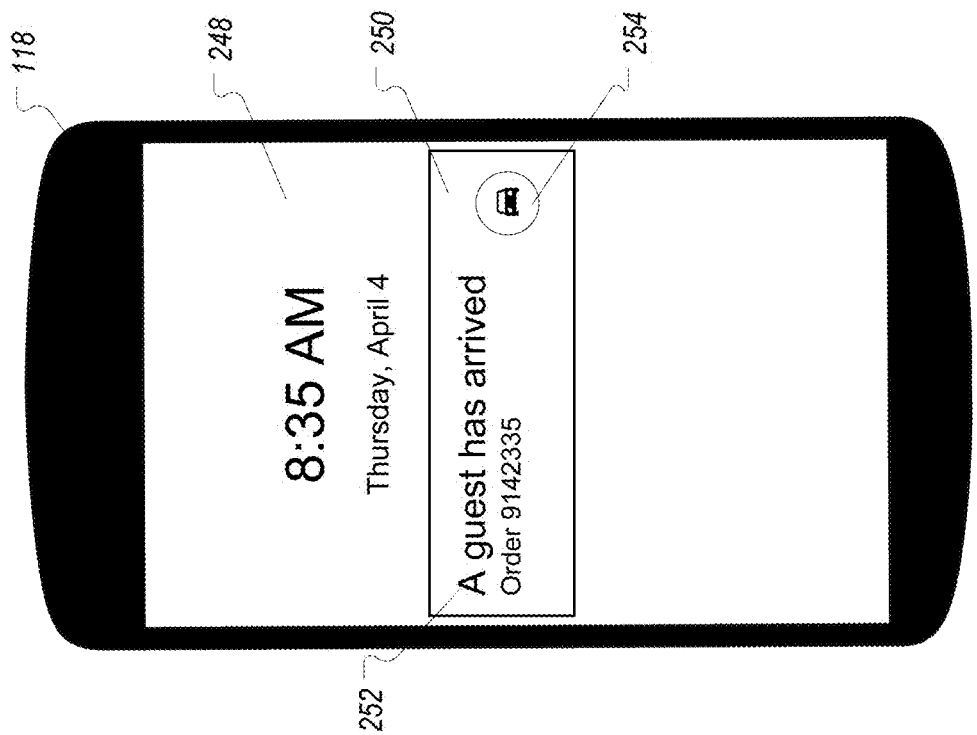
Figure 2G:
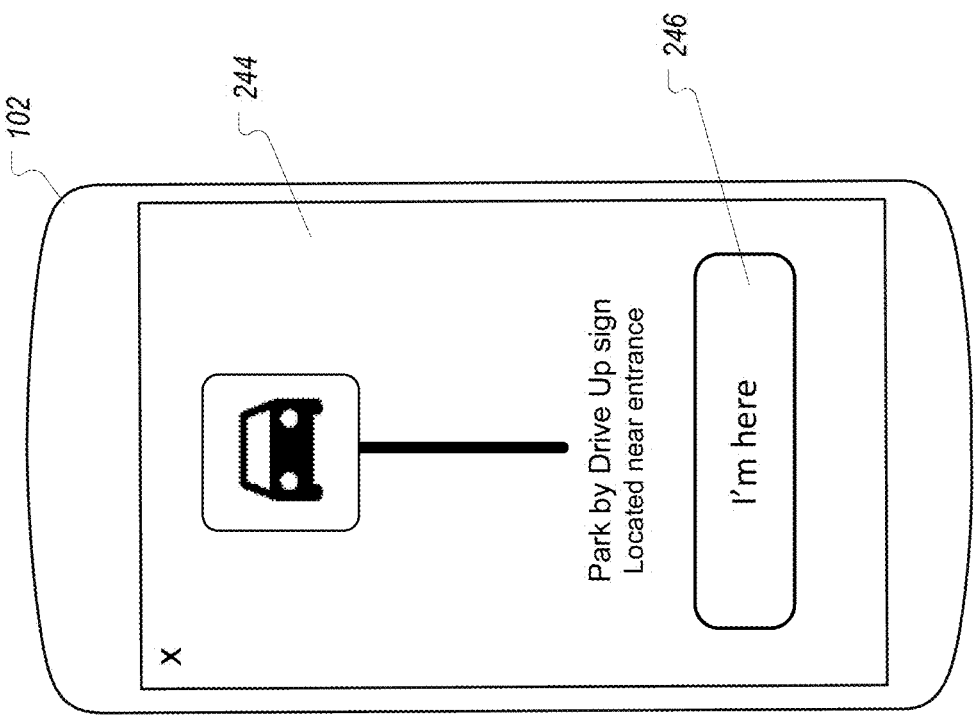

FIG. 2G shows user interface 244 for the mobile device 102 that can be used by the user to inform one or more employees of the store 106 that they have arrived to pick up the order placed by user. In particular, the user interface 244 is used by the user to inform the employees of the store 106 when the user has selected drive-up fulfillment for the order. The user interface 244 can include instructions to the user on where to park for drive-up fulfillment and can also provide instructions to prompt the user to indicate when they have arrived. The user interface 244 includes a user selectable control 246 that they have arrived at the store 106. Upon selection of the control 246 by the user, the mobile device 102 communicates with the server system 116 to indicate that the user has arrived (e.g., to a drive-up sign) at the store 106 at a particular timepoint.

In some examples, an alternate user interface with the control 246 is used by the user to inform the employees of the store 106 when the user has selected in-store pickup for the order. In this case, upon selection of the control 246 by the user, the mobile device 102 communicates with the server system 116 to indicate the user has arrived (e.g., to a pickup counter) at the store 106 at a particular timepoint. The server system 116 can send a communication to the employee device 118 that the user has arrived at the store 106, as described in FIG. 2G.

FIG. 2H shows an example user interface 248 of the computing device 118 containing a notification 250 that is displayed in response to the user arriving at the store 106. For example, upon the server system 116 determining that the user has arrived at the store 106 or receiving a communication from the mobile device 102 indicating that the user has arrived at the store 106, the server system 116 sends a communication to the computing device 118 to cause the computing device 118 to display the notification 250.

The computing device 118 can also provide audio (e.g., ringing, text to speech) or tactile (e.g., vibration) output to notify the employee that the user has arrived. In the example depicted in FIG. 2G, the user interface 248 is displaying a lock screen for the computing device 118. The computing device 118 can provide the notification 250 on the lock screen that indicates that the user has recently arrived at the store 106. The notification 250 includes an indicator 252 that a guest has arrived (i.e., the user has arrived in the parking lot). The notification 250 further includes an order identifier that includes an order number for the user's order.

The notification 250 further includes the icon 254 indicating that the user has selected drive-up order fulfillment for the order. In some implementations, the notification 250 can include more or less information. For example, the notification can include the user's name, vehicle identification information, an indication of a location for the order (e.g., one or more bins in a staging area), an indication that perishable goods for the order need to be collected, or other information related to the order.

Figure 2J:
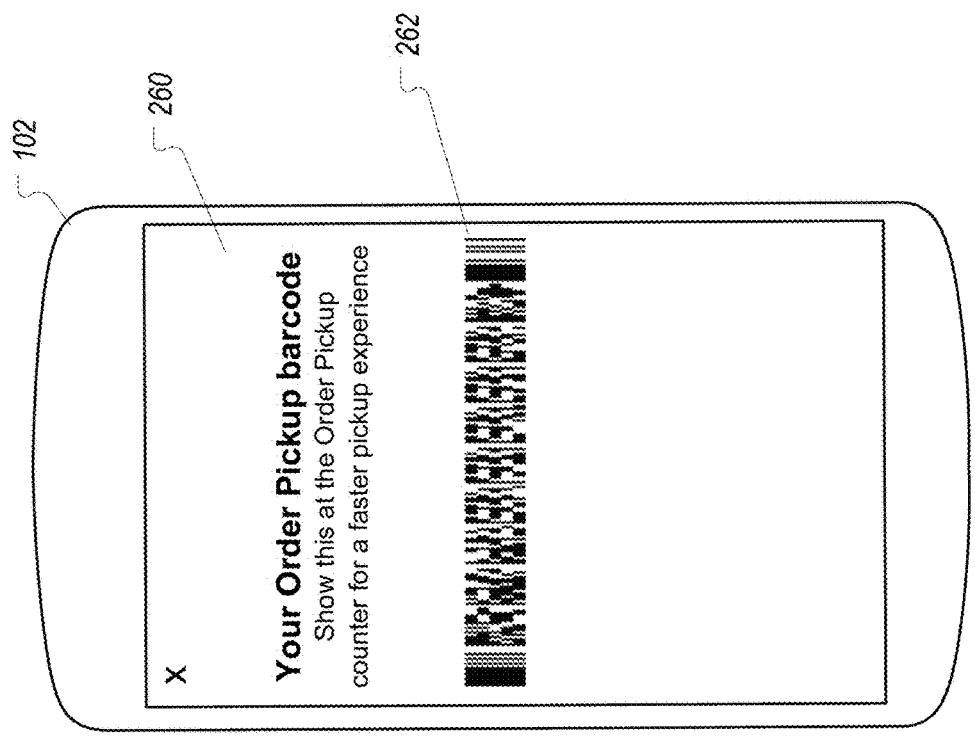
Figure 2I:
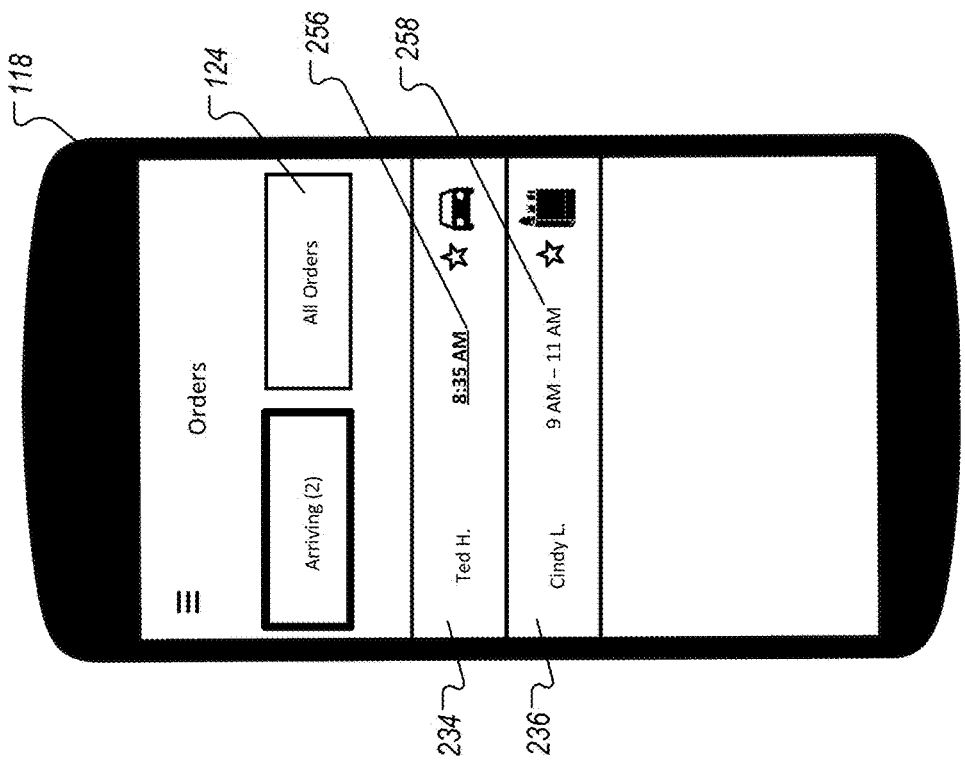

FIG. 2I shows the computing device 118 displaying an updated version of the user interface 120 of FIG. 1 and FIG. 2E. In this example, the user selectable control 122 is selected to cause the user interface 120 to display the list 232 of orders for which the user is scheduled to arrive based on a selected pick up time window and/or has already arrived. The list 232 has been updated such that the order listing 238 is no longer present, indicating that fulfillment of the order associated with the order listing 238 has been completed (e.g., the associated user has received their order).

The order listings 234 and 236 have been updated to indicate updated statuses for the users associated with the respective orders and selected pick up time windows. For example, the order listing 234 indicates that Ted H. has indicated that they arrived at the store 106 at an arrival time 256 of 8:35 AM using the control 246 of FIG. 2F. The computing device 118 may change a color or an appearance of the order listing 234 or the arrival time 256 to indicate whether the arrival time 256 (e.g., the time point) is before the incentivization window, during the incentivization window, or after the incentivization window. In this case, the arrival time 256 of 8:35 AM is during the incentivization window (e.g., the user has successfully arrived at the store 106 during the incentivization window). As such, the computing device 118 may bold the arrival time 256 or change the color of the font of the arrival time 256 to green to indicate that Ted has arrived during the incentivization window. In another example, if Ted had arrived after the incentivization window, the computing device 118 may change the color of the font of the arrival time 256 to red to indicate that Ted has not arrived during the incentivization window.

As another example, the order listing 236 indicates that Cindy L. is scheduled to arrive at the store 106 within an incentivization window 258 of 9 AM to 11 AM. The computing device 118 may adjust a color or an appearance of the order listing 236 or the incentivization window 258 based on whether the current time point is before the incentivization window, during the incentivization window, or after the incentivization window. In this case, if the current time point is 8:40 AM, the computing device 118 may change the color of the font of the incentivization window 258 to yellow to indicate that the current time point is before the incentivization window. Furthermore, once Cindy has arrived at the store 106, the computing device 118 may update the incentivization window 258 to be an arrival time (e.g., the arrival time 256). The computing device 118 may change the color or an appearance of Cindy's arrival time based on whether the arrival time is before the incentivization window, during the incentivization window, or after the incentivization window.

In some examples, the employee use the computing device 118 to confirm that the user has arrived at the store 106 within the incentivization window based on the arrival time. In some examples, the computing device 118 can automatically determine whether the user has arrived at the store within the incentivization window. In some other examples, the server system 116 can automatically determine whether the user has arrived at the store 106 within the incentivization window. For example, the server system 116 can determine whether the arrival time 256 is within the incentivization window of "within an hour," and the server system 116 can send confirmation information to the user after the user has picked up their order, as described in further detail below with reference to FIG. 2K. In response to a determination that the user has successfully arrived to fulfill the order during the designated incentivization window, an account associated with the user is credited the previously identified reward as described above.

FIG. 2J shows an example user interface 260 for the mobile device 102 that includes a barcode 262 for drive-up order fulfillment. The user interface 260 having the barcode 262 can be displayed, for example, in response to selection by the user of the control 246 of FIG. 2F or in response to the user navigating through a menu of the dedicated application. In some implementations, the user interface 260 having the barcode 262 is automatically displayed in response to a determination (e.g., a determination by the employee, the employee device 118, or the server system 116) that the user has arrived at the store 106. In some implementations, the barcode 262 can be displayed as part of a notification on a lock screen of the mobile device 102. The barcode 262 can be a unique barcode that is associated with the user. In some implementations, the barcode 262 can change between each order for the user. In some implementations, the barcode 262 is tied to a specific payment method. In some implementations, another verification method can be used, such as a matrix barcode, a unique character string, or other unique indicator.

The barcode 262 can be scanned by an employee, e.g., to verify the user's identity and verify that the user is authorized to pick up the order. For example, if the user has elected to pick up the order using drive-up fulfillment, the employee can retrieve the bags containing the items for the order from appropriate storage bins (as indicated by the user) and bring the bags out to the user's vehicle. The employee can then scan the barcode 262. For example, the employee can scan the barcode 262 as part of a drive-up fulfillment process or an in-store pickup fulfillment process using a computing device 118.

Upon scanning the barcode 262, the computing device 118 can compare identifying information associated with or conveyed by the barcode 262 to identifying information for the user or the order to verify the user's identity and/or to verify that the employee is providing the correct order(s) to the user. In some implementations, such a determination is made at a central computer of the store 106 in communication with the computing device 118 or at the server system 116.

For example, the barcode 262 can comprise or include a unique identifier for the user. Upon scanning the barcode 262, the computing device 118 can communicate with the server system 116 to retrieve a list of orders associated with the identifier for the user. For example, the server system 116 can access a database of orders and identify all orders placed by the user. The server system 116 communicates this information to the computing device 118 (e.g., via a central computer of the store 106).

In some examples, upon scanning the barcode 262, the computing device 118 can determine whether the order is associated with an incentivization window. For example, the barcode 262 can include an identifier including incentivization information. The computing device 118 can communicate with the server system 116 to confirm that the user has picked up the order, and the server system 116 can determine whether to send a confirmation of the incentive to the user based on the communication from the computing device 118, as described in further detail below with reference to FIG. 2L.

In some implementations, a verification code other than a barcode is used, for example, another form of optically scannable code, such as a QR code, can be used in place of the barcode. As another example, a human readable code can be used in place of the bar code. For example, the mobile device 102 can display a numeric or alphanumeric code. The employee can visually read numeric or alphanumeric code displayed on the mobile device 102 and manually enter the numeric or alphanumeric code into a user interface of the computing device 118. All descriptions made with respect to the above example involving the barcode 262 also apply to examples in which a different type of scannable code or a human readable code is displayed by the mobile device 102. For example, a numeric or alphanumeric code displayed by the mobile device 102 and manually entered into the computing device 118 by the employee can be associated with the order. Scanning of the barcode can also cause the computing device 118 to display information indicating that the user has already paid for the order.

Figure 2L:
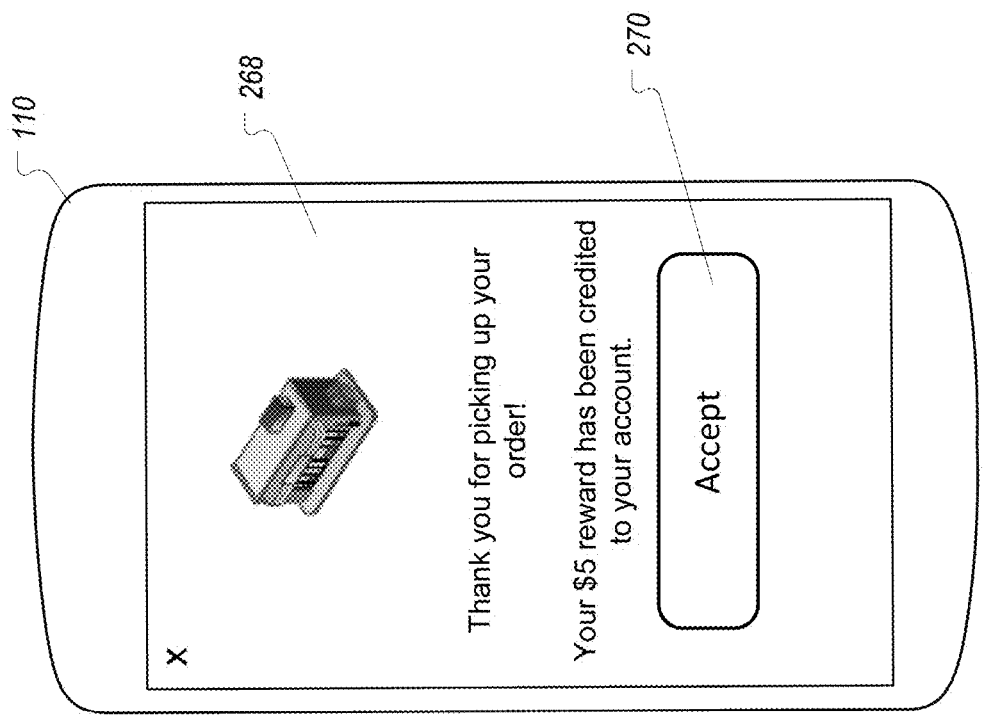
Figure 2K:
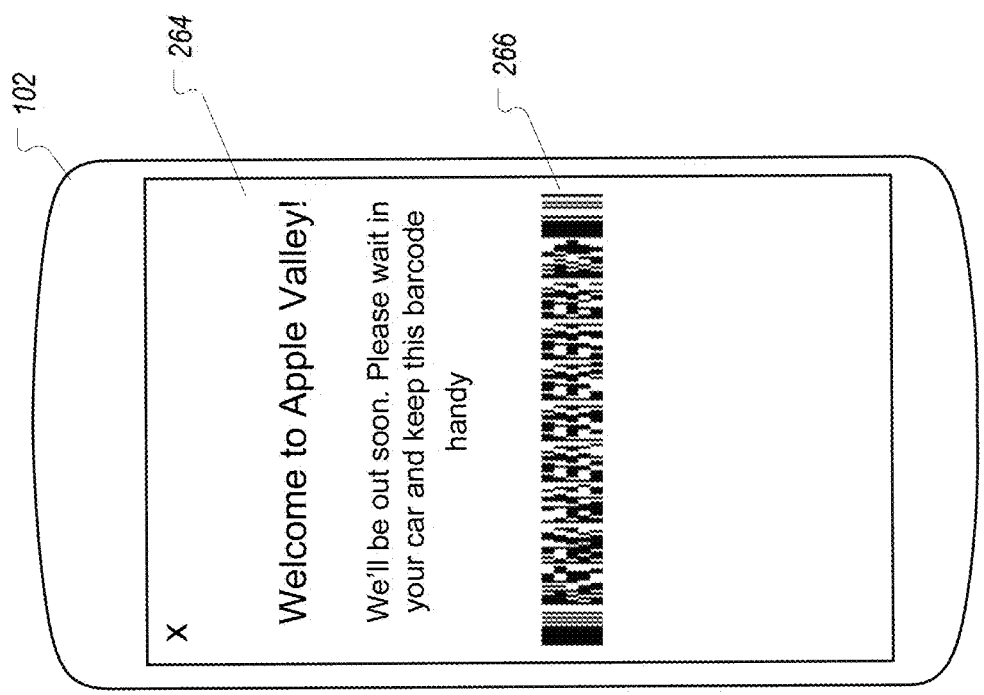

FIG. 2K shows a user interface 264 for the mobile device 102 that is displayed in response to selection of the selection area 208 of the control 206 on the user interface 202 of selecting the order fulfillment type as in-store pickup fulfillment. As shown, the user interface 264 includes a barcode 266 that the user can use to facilitate an in-store pickup order. The barcode 266 can be a unique barcode that is associated with the user. In other implementations, the barcode 266 can be a unique barcode that is associated with the user's order or associated with all active orders for the user. In such implementations, the barcode 266 can change between each order for the same user. In some implementations, the barcode 266 is tied to a specific payment method. In some implementations, another verification method can be used, such as a matrix barcode, a unique character string, or other unique indicator.

The barcode 266 can be scanned by the employee, e.g., using the computing device 118, to verify the user's identity and verify that the order was provided to the user at, for example, an in-store pickup kiosk or counter. For example, the employee can retrieve the bags for the user's order from appropriate storage bins located at or near the in-store pickup fulfillment location and provide the bags containing the user's order to the user. The employee can then scan the barcode 266. The computing device 118 can then provide a notification indicating that the scanned barcode 266 matches the user or the user's order to ensure that the employee has provided the correct order to the user. Scanning of the barcode can also cause the computing device 118 to display information indicating that the user has already paid for the order.

In some examples, upon scanning the barcode 266, the computing device 118 can determine whether the order is associated with an incentivization window. For example, the barcode 266 can include an identifier including incentivization information. The computing device 118 can communicate with the server system 116 to confirm that the user has picked up the order, and the server system 116 can determine whether to send a confirmation of the incentive to the user based on the communication from the computing device 118, as described in further detail below with reference to FIG. 2K.

FIG. 2L shows a user interface 268 for the mobile device 102 that is displayed in response to a user picking up the order within the incentivization window. As shown, the user interface 268 includes a confirmation that the user has picked up the order and accordingly, the user has received a selected incentivization reward in their user account. For example, the server system 116 of FIG. 1 can add the selected incentivization reward to the user's account in response to determining that the user successfully fulfilled the order within the designated incentivization window. Additionally, in some implementations, the user interface may include a user selectable control 270 that they accept the incentivization reward. Upon selection of the control 270 by the user, the mobile device 102 communicates with the server system 116 to indicate that the user has accepted the reward. In this case, the user can use the $5 reward for a future order by selecting the control 210 of the user interface 202.

In some examples, the user can pick up their incentivization reward as part of their order. For example, the user may have selected an incentivization window that corresponds to an incentivization reward of a free beverage. The employee can bring the free beverage to the user as part of their order.

Figure 3:
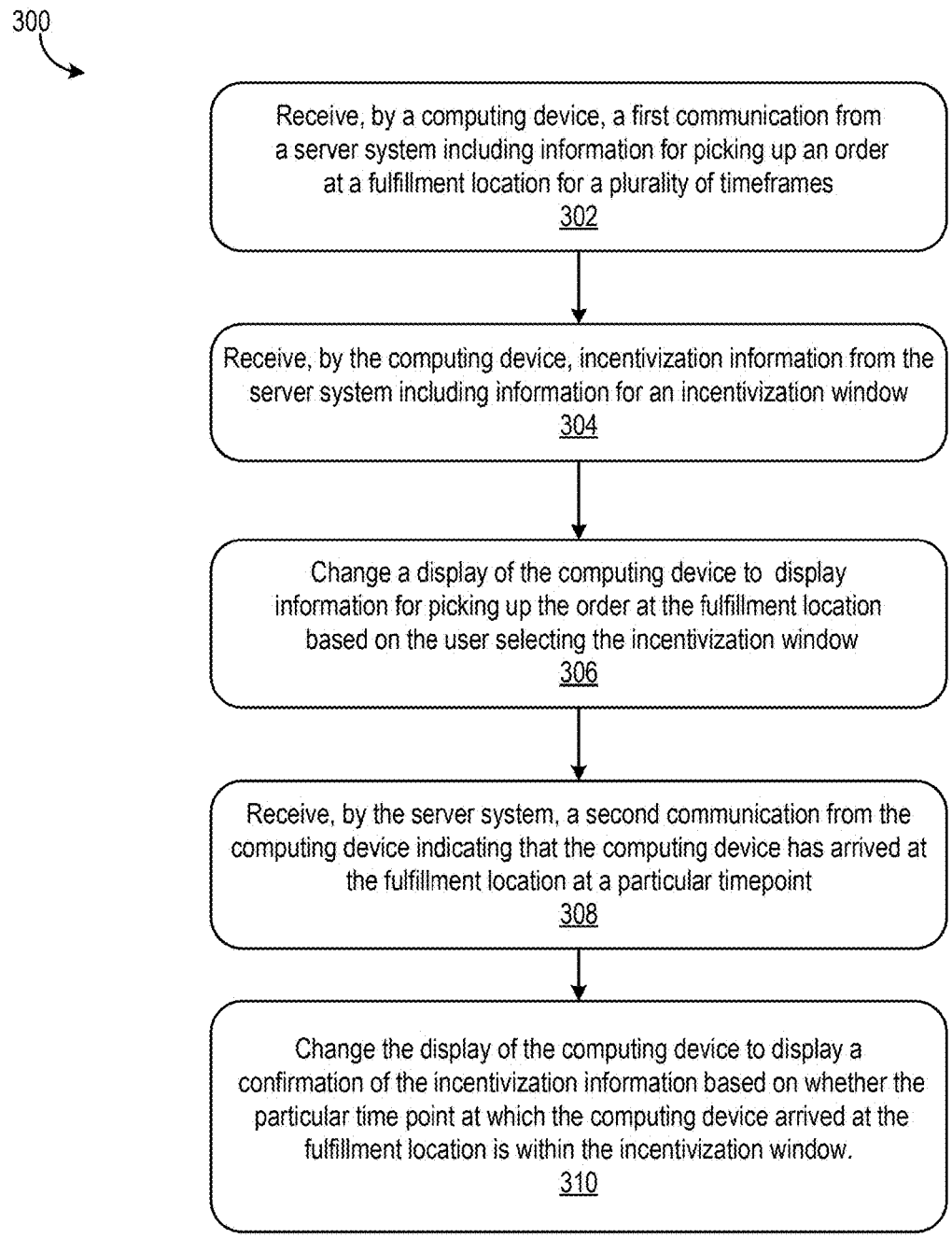
FIG. 3 is a flowchart of an example process to be performed by a computing device in a drive-up order fulfillment system.

FIG. 3 is a flowchart of a process 300 to be performed by one or more computing devices in a drive-up fulfillment system.

The process 300 can be performed by the mobile device 102 and the server system 116 depicted and described in reference to FIG. 1. The process 300 can also be performed by one or more other computing systems, devices, computers, networks, cloud-based systems, and/or cloud-based services. For illustrative purposes, the process 300 is described from the perspective of a mobile device.

At 302, the mobile device can receive a first communication from the server including information for picking up an order at a fulfillment location (e.g., a store) for multiple timeframes. The mobile device is associated with a user account, and the information for picking up the order includes indications of one or more items included in the order and an identifier associated with the user account. The information can also include a field for an order identifier, a field for an identifier associated with the user account, and one or more fields for an identifier of incentivization information. The incentivization information corresponds to an incentive associated with picking up the order at the store during an incentivization window.

At least one of the timeframes of the multiple timeframes is associated with an incentive, such a reward. The reward can be a monetary reward, such as a gift card applied to the user account, a discount on the current order, or a discount on a future order.

At 304, the mobile device can receive incentivization information from the server. The incentivization window is a timeframe of the multiple timeframes that a user can select. For example, the user can select to pick up their order between 2 pm to 4 pm on the same day the user places their order, and the timeframe from 2 pm to 4 pm can be associated with a reward, such as 5% off their future order.

In some cases, the incentive may be associated with one or more items of the order. For example, the store 106 can have amount of available storage for items, and if the store 106 has less than a certain amount of available storage (e.g., less than a threshold), the store 106 can communicate to the server system 116 via a computing device 118 that the store 106 is running out of storage. The server system 116 can then assign items of a user's order with incentivization information for the store 106. In this case, by assigning items of a user's order with the incentivization information, the system can increase the amount of storage more quickly by encouraging a customer to pick up the items within a certain timeframe.

For example, perishable items can take up a certain amount of refrigeration storage, and the server system 116 can assign an incentive to perishable items in order for the user to be encouraged to pick up the order and to free up refrigeration storage.

In some cases, the incentive may be associated with a guest abandonment prediction. The guest abandonment prediction is a likelihood that a user will abandon (e.g., refrain from picking up) their order within a certain time period, such as multiple days.

The server system 116 can assign an incentive to an order if the guest abandonment prediction (e.g., a likelihood of a user abandoning the order) is higher than a threshold. The likelihood of abandonment can be associated with a monetary amount of the order, the items included in the order, user information, or a combination thereof. For example, if the order total is less than $20, the server system 116 can assign an incentive to a pickup window based on the guest abandonment prediction being higher than the threshold, such that the user is encouraged to pick up the order within the incentivization window and to not abandon the order.

The guest abandonment prediction is generated by a trained neural network. The trained neural network can be trained on training data, where the training data includes inputs of past user orders and whether the users abandoned the orders. The inputs of past user orders can include the monetary amount of the order, the types of items included in the order, and user information, such as if a user has previously abandoned an order. During training, the neural network can process the inputs of past user orders and whether the order was abandoned to generate the guest abandonment prediction, which can be outputted as a numerical abandonment prediction factor. In particular, the neural network can assign certain weights to the inputs of past user orders, and the neural network can be trained on a loss that compares the numerical abandonment prediction factor to a ground truth factor.

The trained neural network can process the weighted inputs and generate a numerical abandonment prediction factor between 0 and 1, where 0 corresponds to a low likelihood of abandonment and 1 corresponds to a high likelihood of abandonment. For example, the neural network can output a numerical abandonment prediction factor of 0.7 for an order, and based on a threshold (e.g., a threshold of 0.5), the trained neural network can determine that the guest abandonment prediction is relatively high for the guest to abandon the order.

In some cases, the incentive may be associated with a time of year. For example, the server system 116 can assign an incentive to seasonal items, such as holiday decorations. In this case, a user can be encouraged to pick up the seasonal items within an incentivization window associated with a season or event.

In some cases, the incentive may be associated with the timeframe of the incentivization window being a low traffic timeframe. In particular, the low traffic timeframe is a timeframe during which a relatively low amount of other users picking up orders during the timeframe. For example, if multiple users (e.g., over a certain threshold number of users) have selected to pick up their order during a certain pickup window (e.g., a high traffic pickup window), the server system 116 can assign an incentive to another pickup window (e.g., a low traffic pickup window), where the other pickup window has been selected by less users (e.g., less than a certain number of users). In this case, by assigning the incentive to the low traffic pickup window, the store 106 can more efficiently fulfill customer's orders.

At 306, the mobile device can change a display to display information for picking up the order at the fulfillment location based on the user selecting the incentivization window. For example, the mobile device can display information associated with picking up the order at a store from 2 pm to 4 pm if the user selects a pick up time window of 2 pm to 4 m, and the pick up time window may be associated with an incentive.

At 308, the server can receive a second communication from the mobile device indicating that the mobile device has arrived at the fulfillment location at a particular timepoint. For example, the user may arrive at the fulfillment location at 3 pm, and the mobile device may send a second communication to the server system 116 indicating that the user has arrived.

At 310, the mobile device can change the display of the mobile device to display a confirmation of the incentivization information based on whether the particular time point at which the mobile device arrived at the fulfillment location is within the incentivization window. For example, based on the user arriving at 3 pm, which is during the 2 pm to 4 pm incentivization window, the display on the mobile device displays a confirmation that the user has received the reward associated with the incentive.

Figure 4:
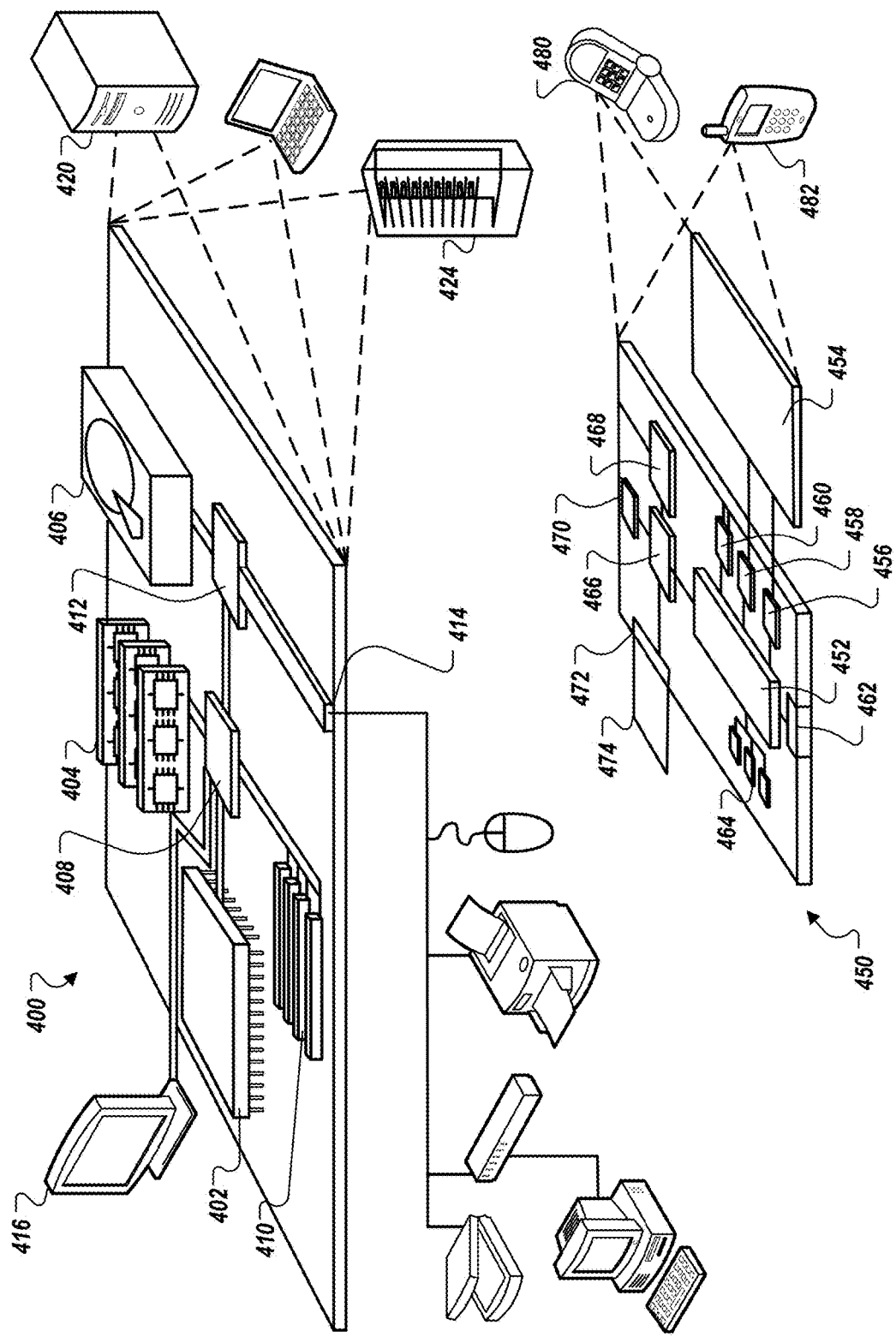
FIG. 4 is a schematic diagram that shows an example of a computing device and a mobile computing device.

FIG. 4 shows an example of a computing device 400 and an example of a mobile computing device that can be used to implement the techniques described here. The computing device 400 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and can be mounted on a common motherboard or in other manners as appropriate. The processor 402 can process instructions for execution within the computing device 400, including instructions stored in the memory 404 or on the storage device 406 to display graphical information for a GUI on an external input/output device, such as a display 416 coupled to the high-speed interface 408. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 can also be another form of computer-readable medium, such as a magnetic or optical disk.

The storage device 406 is capable of providing mass storage for the computing device 400. In some implementations, the storage device 406 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 404, the storage device 406, or memory on the processor 402.

The high-speed interface 408 manages bandwidth-intensive operations for the computing device 400, while the low-speed interface 412 manages lower bandwidth-intensive operations. Such allocation of functions is exemplary only. In some implementations, the high-speed interface 408 is coupled to the memory 404, the display 416 (e.g., through a graphics processor or accelerator), and to the high-speed expansion ports 410, which can accept various expansion cards (not shown). In the implementation, the low-speed interface 412 is coupled to the storage device 406 and the low-speed expansion port 414. The low-speed expansion port 414, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 400 can be implemented in a number of different forms, as shown in the figure. For example, it can be implemented as a standard server 420, or multiple times in a group of such servers. In addition, it can be implemented in a personal computer such as a laptop computer 422. It can also be implemented as part of a rack server system 424. Alternatively, components from the computing device 400 can be combined with other components in a mobile device (not shown), such as a mobile computing device 450. Each of such devices can contain one or more of the computing device 400 and the mobile computing device 450, and an entire system can be made up of multiple computing devices communicating with each other.

The mobile computing device 450 includes a processor 452, a memory 464, an input/output device such as a display 454, a communication interface 466, and a transceiver 468, among other components. The mobile computing device 450 can also be provided with a storage device, such as a micro-drive or other device, to provide additional storage. Each of the processor 452, the memory 464, the display 454, the communication interface 466, and the transceiver 468, are interconnected using various buses, and several of the components can be mounted on a common motherboard or in other manners as appropriate.

The processor 452 can execute instructions within the mobile computing device 450, including instructions stored in the memory 464. The processor 452 can be implemented as a chipset of chips that include separate and multiple analog and digital processors. The processor 452 can provide, for example, for coordination of the other components of the mobile computing device 450, such as control of user interfaces, applications run by the mobile computing device 450, and wireless communication by the mobile computing device 450.

The processor 452 can communicate with a user through a control interface 458 and a display interface 456 coupled to the display 454. The display 454 can be, for example, a TFT (Thin-Film-Transistor Liquid Crystal Display) display or an OLED (Organic Light Emitting Diode) display, or other appropriate display technology. The display interface 456 can comprise appropriate circuitry for driving the display 454 to present graphical and other information to a user. The control interface 458 can receive commands from a user and convert them for submission to the processor 452. In addition, an external interface 462 can provide communication with the processor 452, so as to enable near area communication of the mobile computing device 450 with other devices. The external interface 462 can provide, for example, for wired communication in some implementations, or for wireless communication in other implementations, and multiple interfaces can also be used.

The memory 464 stores information within the mobile computing device 450. The memory 464 can be implemented as one or more of a computer-readable medium or media, a volatile memory unit or units, or a non-volatile memory unit or units. An expansion memory 474 can also be provided and connected to the mobile computing device 450 through an expansion interface 472, which can include, for example, a SIMM (Single In Line Memory Module) card interface. The expansion memory 474 can provide extra storage space for the mobile computing device 450, or can also store applications or other information for the mobile computing device 450. Specifically, the expansion memory 474 can include instructions to carry out or supplement the processes described above, and can include secure information also. Thus, for example, the expansion memory 474 can be provide as a security module for the mobile computing device 450, and can be programmed with instructions that permit secure use of the mobile computing device 450. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 464, the expansion memory 474, or memory on the processor 452. In some implementations, the computer program product can be received in a propagated signal, for example, over the transceiver 468 or the external interface 462.

The mobile computing device 450 can communicate wirelessly through the communication interface 466, which can include digital signal processing circuitry where necessary. The communication interface 466 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 468 using a radio-frequency. In addition, short-range communication can occur, such as using a Bluetooth, WiFi, or other such transceiver (not shown). In addition, a GPS (Global Positioning System) receiver module 470 can provide additional navigation- and location-related wireless data to the mobile computing device 450, which can be used as appropriate by applications running on the mobile computing device 450.

The mobile computing device 450 can also communicate audibly using an audio codec 460, which can receive spoken information from a user and convert it to usable digital information. The audio codec 460 can likewise generate audible sound for a user, such as through a speaker, e.g., in a handset of the mobile computing device 450. Such sound can include sound from voice telephone calls, can include recorded sound (e.g., voice messages, music files, etc.) and can also include sound generated by applications operating on the mobile computing device 450.

The mobile computing device 450 can be implemented in a number of different forms, as shown in the figure. For example, it can be implemented as a cellular telephone 480. It can also be implemented as part of a smart-phone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:
1. A method comprising:
receiving, by a computing device, a first communication from a server system including information for picking up an order at a fulfillment location at a plurality of timeframes, wherein the computing device is logged into an account of the user, wherein the information for picking up the order includes indications of one or more items and an identifier associated with the account of the user;

determining, by the server system, that the order is associated with an incentive based on the user selecting a timeframe of the plurality of time frames, wherein the incentive is based on one or more items of the order being a perishable item, a seasonal item, or both;

receiving, by the computing device, incentivization information from the server system including information for the incentive associated with picking up the order at the fulfillment location during an incentivization window, wherein the incentivization window is a timeframe from the plurality of timeframes associated with an incentive;

changing a display of the computing device to display information for picking up the order at the fulfillment location based on the user selecting the incentivization window;

receiving, by the server system, a second communication from the computing device indicating that the computing device has arrived at the fulfillment location at a particular timepoint based on a location of the computing device; and changing the display of the computing device to display a confirmation of the incentivization information based on whether the particular timepoint at which the computing device arrived at the fulfillment location is within the incentivization window.

2. The method of claim 1, wherein at least one of the timeframes of the plurality of timeframes is associated with an incentive.

3. The method of claim 1, wherein the first communication includes a field for an order identifier, a field for an identifier associated with the account of the user, and at least one field for an identifier of the incentivization information.

4. The method of claim 1, wherein the incentive is associated with one or more items, a time of year, a guest abandonment prediction, or a combination thereof.

5. The method of claim 4, wherein the quest abandonment prediction is a prediction of the likelihood that the user will not pick up the order, and wherein the guest abandonment prediction is generated by a trained neural network.

6. The method of claim 1, wherein the incentive comprises a monetary credit to the account of the user, a discount on a current order, a discount on a future order, a discounted item associated with the fulfillment location, a free item associated with the fulfillment location, or a combination thereof.

7. The method of claim 1, wherein the incentive is associated with the timeframe of the incentivization window being a low traffic timeframe, wherein the low traffic timeframe is associated with a relatively low amount of other users picking up orders during the timeframe.

8. The method of claim 1, further comprising:
in response to changing a display of the computing device to display information for picking up the order at the fulfillment location based on the incentivization window, changing a display of a second computing device to display information associated with the order and an indicator that indicates that the order is associated with the incentivization information.

9. The method of claim 8, wherein the second computing device is associate with an employee of the fulfillment location.

10. The method of claim 8, further comprising:
in response to receiving, by the server system, a second communication from the computing device indicating that the computing device has arrived at the fulfillment location, changing a display of the second computing device to indicate the particular timepoint at which the computing device indicated to have arrived at the fulfillment location.

11. The method of claim 10, further comprising:
confirming, by one of an employee using the second computing device, the second computing device, or the server system, that the time point indicated by the computing device indicated to have arrived at the fulfillment location is within the incentivization window.

12. A system comprising:
one or more processors; and
computer memory containing instructions that, when executed by the one or more processors, cause the system to perform operations comprising:

receiving, by a computing device, a first communication from a server system including information for picking up an order at a fulfillment location at a plurality of timeframes, wherein the computing device is associated with an account of the user, wherein the information for picking up the order includes indications of one or more items and an identifier associated with the account of the user;

determining, by the server system, that the order is associated with an incentive based on the user selecting a timeframe of the plurality of time frames, wherein the incentive is based on one or more items of the order being a perishable item, a seasonal item, or both;

receiving, by the computing device, incentivization information from the server system including information for the incentive associated with picking up the order at the fulfillment location during an incentivization window, wherein the incentivization window is a timeframe from the plurality of timeframes selected by the user;

changing a display of the computing device to display information for picking up the order at the fulfillment location based on the incentivization window;

receiving, by the server system, a second communication from the computing device indicating that the computing device has arrived at the fulfillment location at a particular timepoint based on a location of the computing device; and changing the display of the computing device to display a confirmation of the incentivization information based on whether the particular timepoint at which the computing device arrived at the fulfillment location is within the incentivization window.

13. The system of claim 12, wherein at least one of the timeframes of the plurality of timeframes is associated with an incentive.

14. The system of claim 12, wherein the first communication includes a field for an order identifier, a field for an identifier associated with the account of the user, and at least one field for an identifier of the incentivization information.

15. The system of claim 12, wherein the incentive is associated with one or more items, a time of year, a guest abandonment prediction, or a combination thereof.

16. The system of claim 12, wherein the guest abandonment prediction is a prediction of the likelihood that the user will not pick up the order, and wherein the guest abandonment prediction is generated by a trained neural network.

17. The system of claim 12, wherein the incentive comprises a monetary credit to the account of the user, a discount on a current order, a discount on a future order, a discounted item associated with the fulfillment location, a free item associated with the fulfillment location, or a combination thereof.

18. The system of claim 12, wherein the incentive is associated with the timeframe of the incentivization window being a low traffic timeframe, wherein the low traffic timeframe is associated with a relatively low amount of other users picking up orders during the timeframe.

19. The system of claim 12, the operations further comprising:
- in response to changing a display of the computing device to display information for picking up the order at the fulfillment location based on the incentivization window, changing a display of a second computing device to display information associated with the order and an indicator that indicates that the order is associated with the incentivization information.

20. The system of claim 12, wherein the second computing device is associate with an employee of the fulfillment location.

\* \* \* \* \*